United States Patent
Chen et al.

(10) Patent No.: US 11,424,632 B2
(45) Date of Patent: Aug. 23, 2022

(54) USB CHARGING APPARATUS

(71) Applicant: E-SENSE TECHNOLOGY CO., LTD., New Taipei (TW)

(72) Inventors: Chih Hsin Chen, New Taipei (TW); Shih Che Chiu, New Taipei (TW)

(73) Assignee: E-SENSE TECHNOLOGY CO., LTD., New Taipei (TW)

( * ) Notice: Subject to any disclaimer, the term of this patent is extended or adjusted under 35 U.S.C. 154(b) by 15 days.

(21) Appl. No.: 17/186,404

(22) Filed: Feb. 26, 2021

(65) Prior Publication Data

US 2022/0102992 A1    Mar. 31, 2022

(30) Foreign Application Priority Data

Sep. 25, 2020 (TW) .................................. 109212659

(51) Int. Cl.
*H01M 10/46* (2006.01)
*H02J 7/00* (2006.01)

(52) U.S. Cl.
CPC .......... *H02J 7/0044* (2013.01); *H02J 7/0024* (2013.01); *H02J 2207/30* (2020.01); *H02J 2310/22* (2020.01)

(58) Field of Classification Search
CPC ...... H02J 7/0044; H02J 7/0042; H02J 7/0024; H02J 2207/30; H02J 2310/22
USPC .................................. 320/107, 114, 115, 116
See application file for complete search history.

(56) References Cited

U.S. PATENT DOCUMENTS

| | | | |
|---|---|---|---|
| 2011/0193524 A1* | 8/2011 | Hazzard .................... | G06F 1/26 320/114 |
| 2015/0192968 A1* | 7/2015 | Lindblad ................. | G06F 1/189 361/679.56 |
| 2016/0111902 A1* | 4/2016 | Ergun ................... | H02J 7/0044 320/114 |
| 2017/0027079 A1* | 1/2017 | Dombrowski ............ | H02J 5/00 |
| 2018/0358824 A1* | 12/2018 | Roberts .................... | G06F 1/189 |
| 2019/0027944 A1* | 1/2019 | Grzybowski ......... | H02J 7/0013 |

FOREIGN PATENT DOCUMENTS

CN          103309835 A   *   9/2013   ............. G06F 1/266

* cited by examiner

*Primary Examiner* — Edward Tso

(57) ABSTRACT

An improved USB charging apparatus includes a main body and a plurality of power processing modules arranged in the main body; each one of the power processing modules having two USB charging ports connected thereto, and the two USB charging ports configured to be a first charging port and a second charging port having specifications different from each other; the first charging port and the second charging port arranged adjacent to each other; each one of the power processing modules further comprising a detection control circuit and a switch circuit, allowing each charging circuit to be provided with the charging ports of two types of specifications, such that user can choose one of the charging ports for use depending upon the actual needs. Accordingly, the improved USB charging apparatus is not limited to certain specifications of charging ports only, thereby increasing the use significantly.

18 Claims, 4 Drawing Sheets

USB CHARGING APPARATUS

BACKGROUND OF THE INVENTION

1. Technical Field

The present invention is related to a charging apparatus of equipped with a USB interface for electronic product, and in particular, to an improved USB charging apparatus equipped with two types of specifications available for selection of one type thereof for use and also equipped with a protective design.

2. Description of Related Art

As there are electronic devices of numerous brands in the market, such as mobile phones, tablets and notebooks, etc., their power consumption specifications are different from each other; for example, they may be equipped with the charging ports of USB Type-C, USB Micro-B, Apple Lightning, USB Mini-B, etc., and may also use the charging cables of Type-C to Type-C, Type-A to Type-C, Type-A to Micro-B, Type-A to Lightning, Type-C to Lightning, Type-A to Mini-B, Type-C to Micro-B, etc., in conjunction. In general, the charging of the aforementioned electronic products mostly use the common Type-A or Type-C output port for conversion and connection to the applicable charging port of each device. Accordingly, the common specifications of Type-A with transition to Type-C are the two types of specifications most widely adopted in multi-port chargers currently available in the market.

For a common charger with 4-5 ports or more, such as a multi-port charger equipped with all Type-A interfaces or a multi-port charger equipped with 2-3 Type-A interfaces and 2 Type-C interfaces or others combination, such charger can be used to charge 4-5 electronic products equipped with interfaces matching with the aforementioned ports. However, due to the cost and product competitiveness, for multi-port chargers currently available in the market, the power protocol chips used are unable to adjust the charging attributes of an interface with the output of two types of specifications at the same time (e.g., when a large power product is used to adjust the output, a product of small power would become overload and damaged). Consequently, each set of power protocol chip is only applicable to one single Type-A interface output connected or one single Type-C interface output connected. As a result, most of the multi-port chargers available in the market have interfaces with a fixed specification (such as limited to 3 Type-A interfaces or 2 type-A interfaces). When the user demands for a change or when the usage of one of the specifications increases, such existing chargers cannot satisfy the demand, causing inconvenience to the user.

In view of the above, the inventor seeks to overcome such drawbacks through research and development as well as extensive attempts and designs in order to achieve the present invention.

BRIEF SUMMARY OF THE INVENTION

The main objective of the present invention is to provide an improved USB charging apparatus. Through a protective design, each charging circuit is provided with charging ports of two types of specifications in order to allow the user to choose and use such ports depending upon the actual needs. Consequently, the problem of restricted interface specification can be overcome, and the use convenience is significantly increased.

To achieve the aforementioned effects and objectives, an improved USB charging apparatus of the present invention, comprises a main body and a plurality of USB charging ports arranged on the main body and provided for electronic equipment to be connected thereto. The main technical means adopted is to provide a plurality of power processing modules on the main body; each one of the power processing modules having two USB charging ports connected thereto, and the two USB charging ports configured to be a first charging port and a second charging port having specifications different from each other; the first charging port and the second charging port arranged adjacent to each other and having a separation distance less than 2 mm from each other, thereby allowing the electronic equipment to be connected to either the first charging port or the second charging port selectively. In addition, the two charging ports being arranged adjacent to each other are able to form a physical mechanism protective design, such that when one of the charging ports is being used, a physical obstacle can be formed to prevent the situation where two charging ports are inserted at the same time. Furthermore, one charging circuit (power processing module) is commonly used by two charging ports, such that it is able to provide an appropriate charging attribute according to the interface specification selected and used by the user. Accordingly, each power processing module of the main body is able to supply power according to the specification selected and used by the user, thereby preventing the problem due to the limitation of charging port specification.

According to the aforementioned structure, wherein each one of the power processing modules at least comprises a power chip and a protocol chip; the protocol chip is connected between the power chip and the two USB charging ports and is used to identify a charging attribute of the electronic equipment during connection thereof; the power chip is further connected to a main power source of the main body and is used to receive a power provided by the main power source and to supply a corresponding power according to a charging attribute conversion identified by the protocol chip.

According to the aforementioned structure, wherein each one of the power processing modules further includes a detection control circuit and a switch circuit arranged between the protocol chip and the two USB charging ports; the detection control circuit is used to detect whether the electronic equipment is connected to the two USB charging ports; the switch circuit is used to switch between a connected state or a disconnected state of the two USB charging ports with the protocol chip respectively; wherein when the electronic equipment is connected to one of the two charging ports, the detection control circuit informs the switch circuit to disconnect the protocol chip with another USB charging port such that it is not connected the electronic equipment. Accordingly, the further use of the circuit protective design is able to prevent the problem of inappropriate output properly.

The present invention is mainly to allow each charging circuit to achieve the two-for-one charging design. Through the physical mechanism or circuit protection design, each charging circuit (power processing module) of a multi-port charger is able to allow the user to choose one port for use depending upon the needs; therefore, it is able to overcome the drawback of use difficulty due to change of use demand.

Preferably, the first charging port and the second charging port are a Type-A charging port and a Type-C charging port respectively, and the separation distance between the two is less than 1 mm. The main body comprises an outer casing; the plurality of power processing modules are arranged inside the outer casing, and the plurality of USB charging ports are formed on at least one side of the outer casing. In addition, one side surface of the outer casing of the main body includes a plurality of receiving slots for placing the electronic equipment thereon. Furthermore, the plurality of receiving slots are formed by a plurality of vertical plates arranged spaced apart from each other in order to allow the electronic equipment to be placed in an upright manner.

To further illustrate the aforementioned objectives, features and functional effects of the present invention, the following describes the preferred embodiments of the present invention in conjunction with the accompanied drawings:

DETAILED DESCRIPTION OF THE INVENTION

Figure 1:
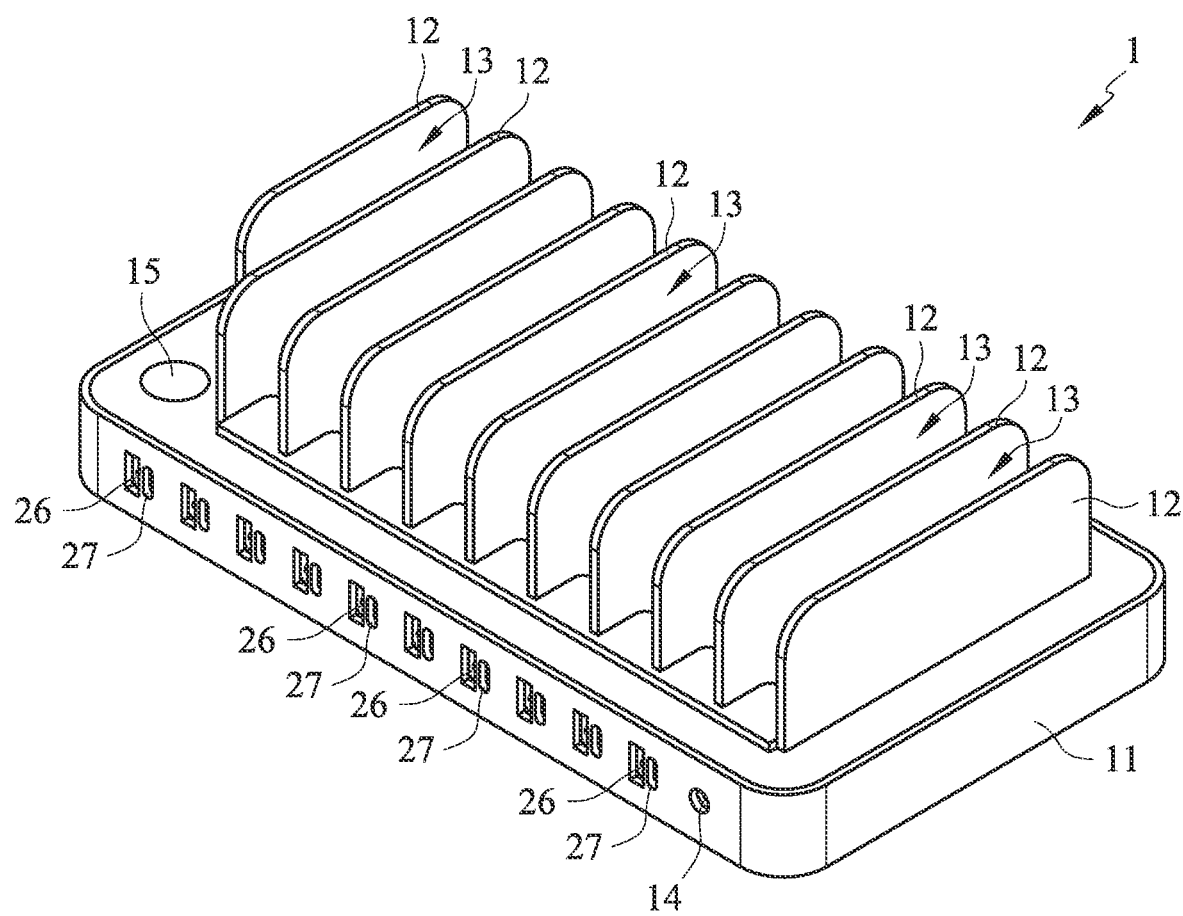
FIG. 1 is a perspective appearance view of a preferred embodiment of the present invention.
Figure 2:
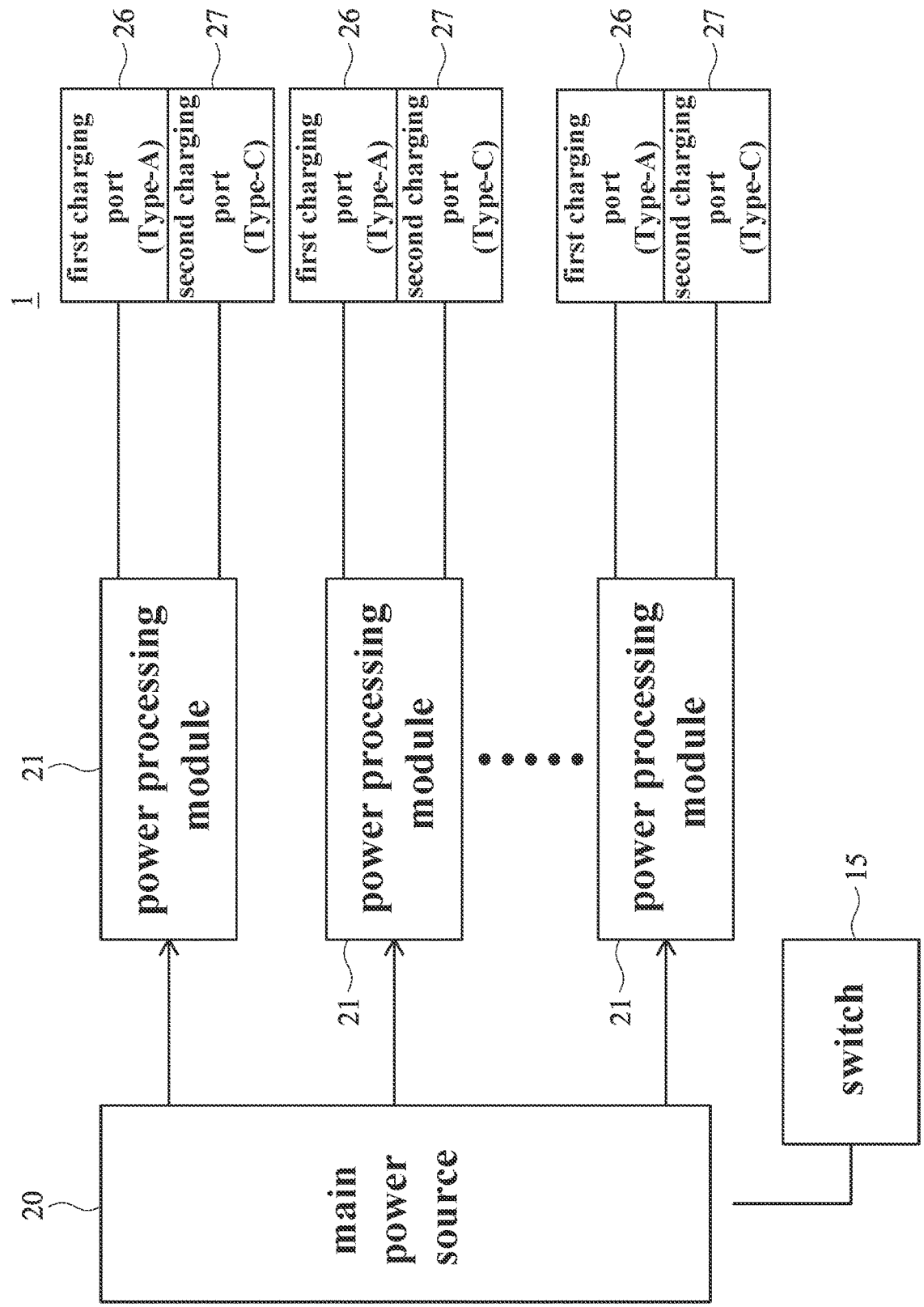
FIG. 2 is a circuit block diagram of a preferred embodiment of the present invention.
Figure 3:
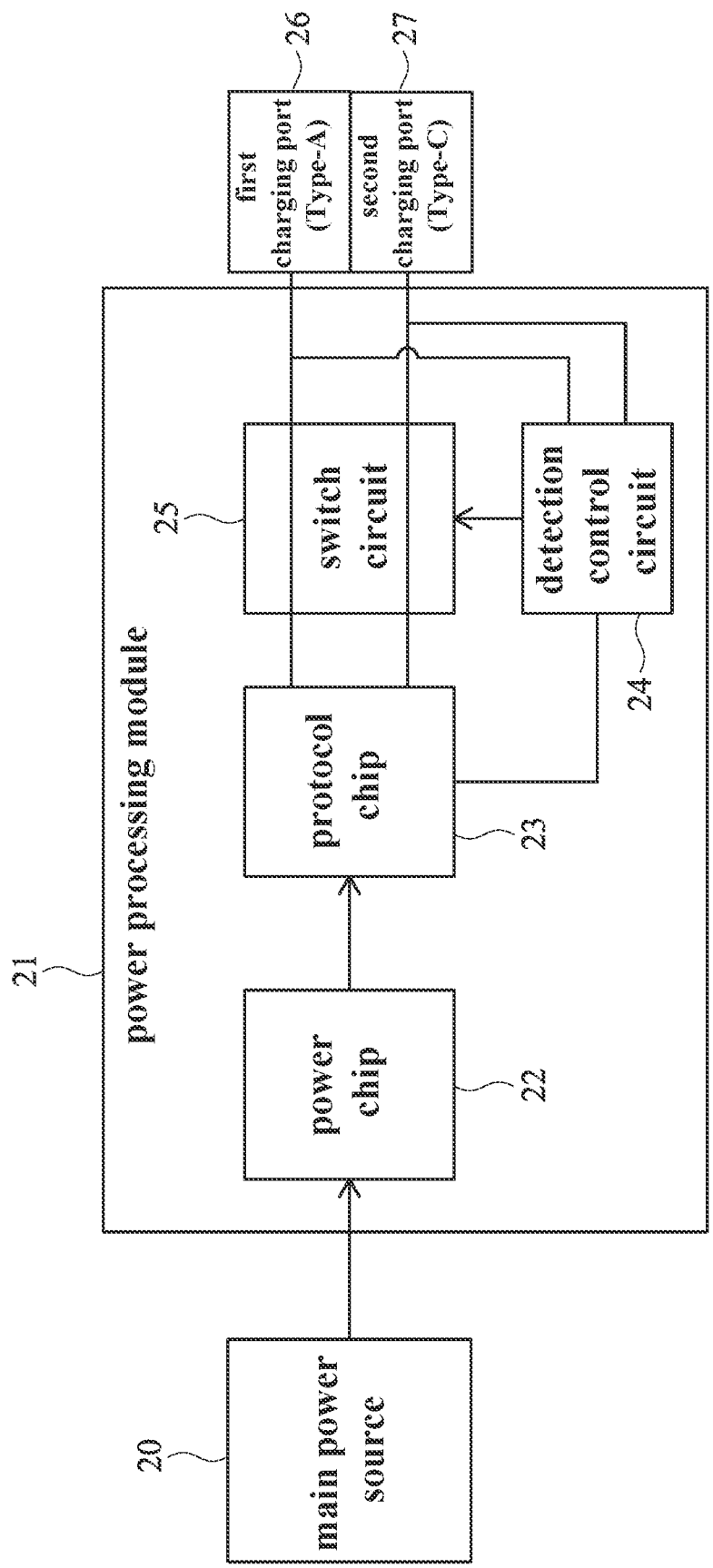
FIG. 3 is a charging circuit block diagram of a preferred embodiment of the present invention.

Please refer to FIG. 1 to FIG. 3. As shown in the drawings, an improved USB charging apparatus of the present invention mainly comprises a main body 1, the main body 1 comprises an outer casing 11 and a charging mechanism arranged therein. The charging mechanism comprises a main power source 20 and a plurality of power processing modules 21. Each one of the power charging modules 21 is respectively connected to two USB charging ports formed on the outer casing 11. The two USB charging ports are a first charging port 26 and a second charging port 27 having specifications different from each other respectively.

The outer casing 11 includes a power interface 14 and a switch 15 connected to the main power source 20 respectively. The power interface 14 is used for power cord connection for the introduction of power. The switch 15 is used to turn on or off the operation of the main power source 20. In this embodiment, after the main power source 20 is turned on, it is able to convert an AC power (90-240V) introduced from the external into a DC power (12-30V or 12-48V) applicable to the electronic equipment.

Each one of the power processing modules 21 at least comprises a power chip 22 and a protocol chip 23. The protocol chip 23 is connected between the power chip 22 and the two USB charging ports (the first charging port 26 and the second charging port 27) and is used to identify a charging attribute (power) of the electronic equipment when it is connected to the charging port. The power chip 22 is further connected to the main power source 20 and is used to receive a power provided by the main power source 20 and to supply a corresponding power of charging and discharging attribute according to the charging attribute conversion identified by the protocol chip 23.

In this embodiment, the two USB charging ports connected to each one of the power processing modules 21 are arranged in a pair and formed on one lateral side of the outer casing 11. In other words, the first charging port 26 and the second charging port 27 connected to each one of the power processing module 21 are arranged adjacent to each other and exposed at the side surface of the outer casing 1. For each set of the first charging port 26 and the second charging port 27, the separation distance between the two is at least less than 2 mm (smaller than the width of a conventional USB connector outer casing, the separation distance can be less than 1.7 mm, and preferably configured to be less than 1 mm). Accordingly, when the user is using each set of the charging ports, the user can only choose one of the first charging port 26 and the second charging port 27 for use. The USB connector outer casing is utilized to form a blocking or obstacle to the other charging port, thereby preventing the other charging port to be further connected. Consequently, a physical mechanism protective design can be achieved to prevent confusion and hassle during the use thereof.

Furthermore, in this embodiment, for each of the power processing module 21, a detection control circuit 24 and a switch circuit 25 are arranged between the protocol chip 23 and the two USB charging ports (i.e., the first charging port 26 and the second charging port 27) connected thereto. This is a circuit protective design to properly prevent any charging output that is not predefined, thereby ensuring the use safety and power consumption stability. The detection control circuit 24 is used to detect whether the electronic equipment is connected to the two USB charging ports, and the switch circuit 25 is used to switch between a connected state or a disconnected state of the two USB charging ports with the protocol chip 23 respectively. When the detection control circuit 24 detects that electronic equipment is connected to one of the two USB charging ports, it is able to transmit a relevant signal to the protocol chip 23 and the switch circuit 25. The protocol chip 23 is able to identify the charging and discharging attribute of the electronic device in order to obtain corresponding power from the power chip 22 for supply. In addition, after the switch circuit 25 receives the signal notice, it is able to disconnect the circuit of one of the two USB charging ports without the electronic equipment being connected thereto, thereby allow the charging output of the power processing module 21 to be supplied to the USB charging port with the electronic equipment connected thereto.

In this embodiment, the first charging port 26 and the second charging port 27 respectively refer to a Type-A charging port and a Type-C charging port commonly used in the current market. In addition, the main body 1 can further include a plurality of vertical plates 12 arranged on the top surface of the outer casing 11. With such vertical plates 12, a plurality of receiving slots 13 can be formed in order to allow the electronic device to be naturally placed inside the receiving slot 13 during the use of the main body 11 for charging. Accordingly, it is able to maintain a neat appearance with beauty and to prevent tangling of charging cables when numerous electronic equipment is used.

Figure 4:
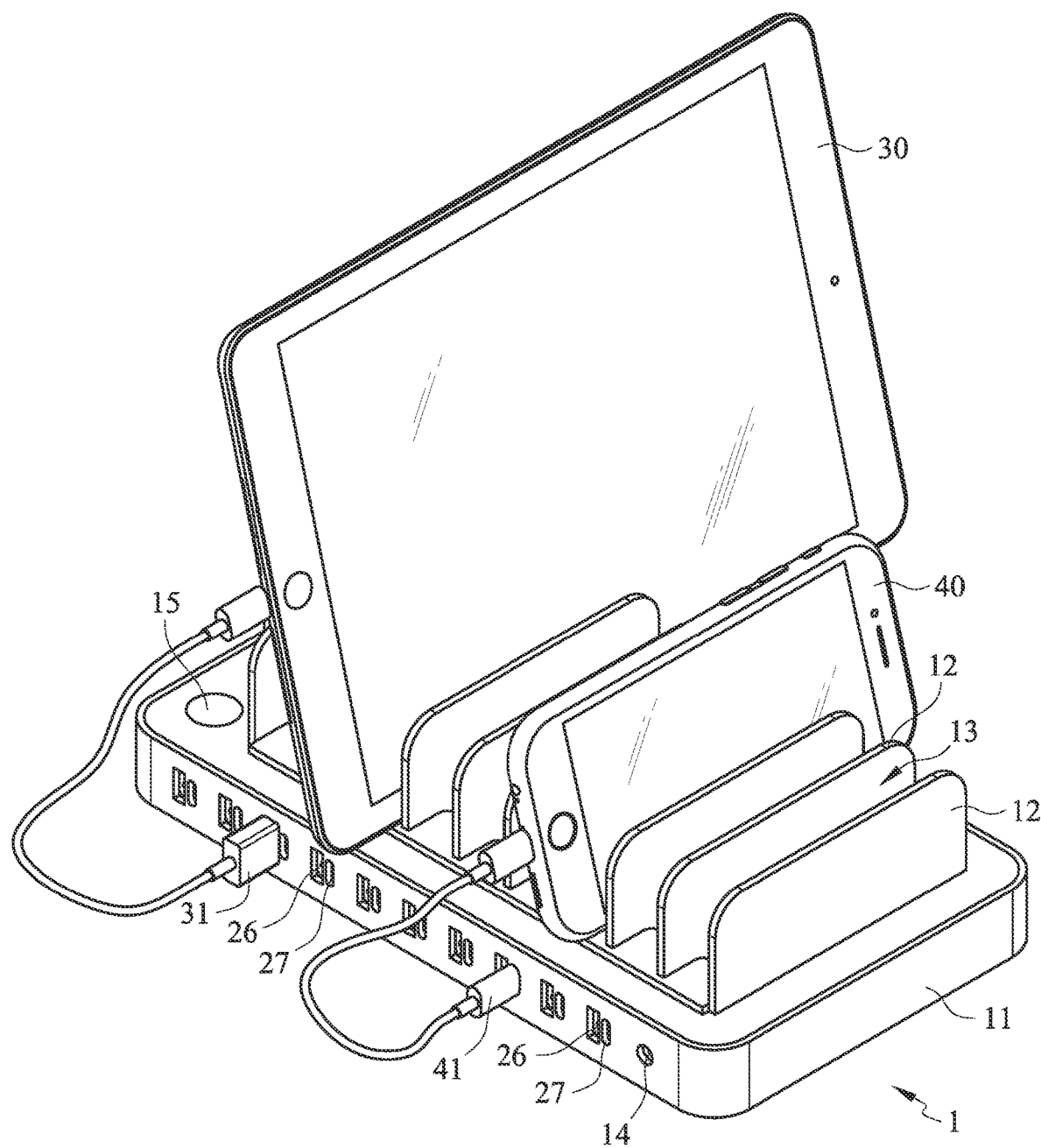
FIG. 4 is an actual application schematic view of a preferred embodiment of the present invention.

During the actual application, as shown in FIG. 4, when the electronic equipment 30 is to be charged and when it uses a USB connector 31 applicable to the specification of Type-A, then the user can simply insert the USB connector 31 into the first charging port 26 (Type-A charging port) in any one set of the charging ports, and an obstacle to the adjacent second charging port 27 can be formed via the outer casing of the USB connector 31, which is the physical mechanism protective design adopted in the present invention. In addition, after the USB connector 31 is inserted, the corresponding detection control circuit 24 transmits a relevant signal to the corresponding protocol chip 23 and the switch circuit 25. At this time, the protocol chip 23 is able to identify the charging and discharging attribute of the electronic equipment 30, allowing the corresponding power chip 22 to supply a corresponding power. Furthermore, after the switch circuit 25 receives the signal, it is able to perform switch in order to allow the protocol chip 23 to form a disconnected state at the second charging port 27. Consequently, the charging output of such set of chip can be provided to the predefined target (i.e., the electronic equipment 30) at the first charging port 26 detected and identified only, thereby properly preventing the output of power to any target that has not been detected and identified, which is the circuit protection design adopted in the present invention.

Similarly, when the electronic equipment 40 is to be charged and when it uses a USB connector 41 applicable to the specification of Type-C, then the user can simply insert the USB connector 41 into the second charging port 27 (Type-C charging port) in any one set of the charging ports, and an obstacle to the adjacent first charging port 26 can be formed via the outer casing of the USB connector 41, which is the physical mechanism protective design adopted in the present invention. In addition, after the USB connector 41 is inserted, the corresponding detection control circuit 24 transmits a relevant signal to the corresponding protocol chip 23 and the switch circuit 25. At this time, the protocol chip 23 is able to identify the charging and discharging attribute of the electronic equipment 40, allowing the corresponding power chip 22 to supply a corresponding power. Furthermore, after the switch circuit 25 receives the signal, it is able to perform switch in order to allow the protocol chip 23 to form a disconnected state at the first charging port 26. Consequently, the charging output of such set of chip can be provided to the predefined target (i.e., the electronic equipment 40) at the second charging port 27 detected and identified only, thereby properly preventing the output of power to any target that has not been detected and identified, which is the circuit protection design adopted in the present invention.

In view of the above, it can be understood that in comparison to known multi-port chargers, the present invention is not restricted by the specifications of charging ports but is able to satisfy various demands of consumers. The present invention is able to provide great convenience to users and is also equipped with protection and safety. Accordingly, the present invention satisfies the patentability requirements and a patent application is filed according to the laws. However, it shall be understood that the content of the above description is provided to illustrate the preferred embodiments of the present invention only, and the actual scope of protection shall be based on the claims described in the following. Any equivalent changes or modifications made based on the spirit and scope of the present invention shall be considered to be within the scope of the claims of the present invention.

What is claimed is:

1. An improved USB charging apparatus, comprising a main body and a plurality of USB charging ports arranged on the main body and provided for electronic equipment to be connected thereto, characterized in that:
   the main body comprising a plurality of power processing modules; each one of the power processing modules having two USB charging ports connected thereto, and the two USB charging ports configured to be a first charging port and a second charging port having specifications different from each other; the first charging port and the second charging port arranged adjacent to each other and having a separation distance less than 2 mm from each other, thereby allowing the electronic equipment to be connected to either the first charging port or the second charging port selectively.

2. The improved USB charging apparatus according to claim 1, wherein the first charging port and the second charging port are a Type-A charging port and a Type-C charging port respectively, and the separation distance between the two is less than 1 mm.

3. The improved USB charging apparatus according to claim 1, wherein each one of the power processing modules at least comprises a power chip and a protocol chip; the protocol chip is connected between the power chip and the two USB charging ports and is used to identify a charging attribute of the electronic equipment during connection thereof; the power chip is further connected to a main power source of the main body and is used to receive a power provided by the main power source and to supply a corresponding power according to a charging attribute conversion identified by the protocol chip.

4. The improved USB charging apparatus according to claim 3, wherein each one of the power processing modules further includes a detection control circuit and a switch circuit arranged between the protocol chip and the two USB charging ports; the detection control circuit is used to detect whether the electronic equipment is connected to the two USB charging ports; the switch circuit is used to switch between a connected state or a disconnected state of the two USB charging ports with the protocol chip respectively; wherein when the electronic equipment is connected to one of the two charging ports, the detection control circuit informs the switch circuit to disconnect the protocol chip with another USB charging port such that it is not connected the electronic equipment.

5. The improved USB charging apparatus according to claim 1, wherein the main body comprises an outer casing; the plurality of power processing modules are arranged inside the outer casing, and the plurality of USB charging ports are formed on at least one side of the outer casing.

6. The improved USB charging apparatus according to claim 5, wherein one side surface of the outer casing of the main body includes a plurality of receiving slots for placing the electronic equipment thereon.

7. The improved USB charging apparatus according to claim 6, wherein the plurality of receiving slots are formed by a plurality of vertical plates arranged spaced apart from each other.

8. The improved USB charging apparatus according to claim 4, wherein the main body comprises an outer casing; the plurality of power processing modules are arranged inside the outer casing, and the plurality of USB charging ports are formed on at least one side of the outer casing.

9. The improved USB charging apparatus according to claim 8, wherein one side surface of the outer casing of the main body includes a plurality of receiving slots for placing the electronic equipment thereon.

10. The improved USB charging apparatus according to claim 9, wherein the plurality of receiving slots are formed by a plurality of vertical plates arranged spaced apart from each other.

11. The improved USB charging apparatus according to claim 2, wherein each one of the power processing modules at least comprises a power chip and a protocol chip; the protocol chip is connected between the power chip and the two USB charging ports and is used to identify a charging attribute of the electronic equipment during connection thereof; the power chip is further connected to a main power source of the main body and is used to receive a power provided by the main power source and to supply a corresponding power according to a charging attribute conversion identified by the protocol chip.

12. The improved USB charging apparatus according to claim 11, wherein each one of the power processing modules further includes a detection control circuit and a switch circuit arranged between the protocol chip and the two USB charging ports; the detection control circuit is used to detect whether the electronic equipment is connected to the two USB charging ports; the switch circuit is used to switch between a connected state or a disconnected state of the two USB charging ports with the protocol chip respectively; wherein when the electronic equipment is connected to one of the two charging ports, the detection control circuit informs the switch circuit to disconnect the protocol chip with another USB charging port such that it is not connected to the electronic equipment.

13. The improved USB charging apparatus according to claim 2, wherein the main body comprises an outer casing; the plurality of power processing modules are arranged inside the outer casing, and the plurality of USB charging ports are formed on at least one side of the outer casing.

14. The improved USB charging apparatus according to claim 13, wherein one side surface of the outer casing of the main body includes a plurality of receiving slots for placing the electronic equipment thereon.

15. The improved USB charging apparatus according to claim 14, wherein the plurality of receiving slots are formed by a plurality of vertical plates arranged spaced apart from each other.

16. The improved USB charging apparatus according to claim 12, wherein the main body comprises an outer casing; the plurality of power processing modules are arranged inside the outer casing, and the plurality of USB charging ports are formed on at least one side of the outer casing.

17. The improved USB charging apparatus according to claim 16, wherein one side surface of the outer casing of the main body includes a plurality of receiving slots for placing the electronic equipment thereon.

18. The improved USB charging apparatus according to claim 17, wherein the plurality of receiving slots are formed by a plurality of vertical plates arranged spaced apart from each other.

* * * * *